United States Patent
Yamasaki et al.

(10) Patent No.: US 8,341,657 B2
(45) Date of Patent: Dec. 25, 2012

(54) LENS DRIVING MECHANISM FOR OPTICAL PICKUP AND OPTICAL DISC APPARATUS

(75) Inventors: Tatsuya Yamasaki, Hitachinaka (JP); Yoshihiro Sato, Hitachinaka (JP); Seiichi Kato, Tsuchiura (JP); Katsuhiko Kimura, Kasumigaura (JP); Takahiro Yamaguchi, Yokohama (JP); Yoshiro Konishi, Mito (JP); Hidenao Saito, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 552 days.

(21) Appl. No.: 12/542,078

(22) Filed: Aug. 17, 2009

(65) Prior Publication Data
US 2010/0067354 A1     Mar. 18, 2010

(30) Foreign Application Priority Data

Sep. 16, 2008  (JP) ................................ 2008-235853

(51) Int. Cl.
*G11B 7/135*  (2012.01)
(52) U.S. Cl. ................. 720/676; 369/44.32; 369/112.23
(58) Field of Classification Search .................. 359/819, 359/822–824; 369/44.11, 44.14, 44.17, 44.21, 369/44.23, 44.24, 112.01, 112.23–112.26, 369/44.32; 720/672–679
See application file for complete search history.

(56) References Cited

U.S. PATENT DOCUMENTS

| | | | |
|---|---|---|---|
| 2007/0109923 A1* | 5/2007 | Mizuno et al. | 369/43 |
| 2007/0263300 A1* | 11/2007 | Tengeiji et al. | 359/823 |
| 2008/0095017 A1* | 4/2008 | Kawamura et al. | 369/112.24 |
| 2008/0253264 A1* | 10/2008 | Nagatomi et al. | 369/112.16 |

FOREIGN PATENT DOCUMENTS

| | | |
|---|---|---|
| JP | 2003-338069 | 11/2003 |
| JP | 2008-059643 | 3/2008 |
| WO | WO2006/038483 | 4/2006 |
| WO | WO2007/083809 | 7/2007 |

* cited by examiner

*Primary Examiner* — Nathan Danielsen
(74) *Attorney, Agent, or Firm* — Antonelli, Terry, Stout & Kraus, LLP.

(57) ABSTRACT

An optical pickup, mounting a lens actuator 101 thereon, the lens actuator comprises: a lens 1 having an optical axis in direction in parallel with an optical disc; a holder 2, which holds the lens thereon; a first guide shaft 3 holding the holder, so as to regulate the holder to change a position thereof, into an inner surface direction of a surface having the optical axis of the lens as a normal line vector thereof; a second guide shaft 4, which regulates the holder to change the position thereof, into a normal line vector of an optical disc; and a reed screw, which moves the holder into direction of the optical axis of the lens, wherein a distance between the optical axis of the lens and the optical disc, a distance between a central axis of the first guide shaft and the optical disc, and a distance between a central axis of the second guide shaft and the optical disc are lager than a distance between a central axis of the reed screw and the optical disc.

12 Claims, 6 Drawing Sheets

LENS DRIVING MECHANISM FOR OPTICAL PICKUP AND OPTICAL DISC APPARATUS

BACKGROUND OF THE INVENTION

The present invention relates to an optical pickup, within an optical disc apparatus for reading out or recording information recorded from/onto a recording surface of an optical disc, and it further relates to the optical disc apparatus comprising the same therein.

An optical disc apparatus for recording information onto a disc-like recording medium or reading out the information recorded thereon, for reproducing, since it is able to record the information of a relatively large amount or volume thereof on the optical disc, and also since the medium can be handled easily because of a large rigidity thereof, is used widely, as an external recording device for a computer and/or a recording apparatus for audio/video.

In such the optical disc apparatus, a mechanism for driving a lens, which focuses or diverges lights from a light emitting element, in an optical axis direction thereof, is a lens actuator. In general, the lens actuator is made up with a lens, a moving part including a holder for holding the lens thereon, a supporting member(s) for supporting this moving part, and a driving portion, such as, a motor, etc. Supplying drive current to the driving portion, such as, the motor, etc., allows driving the moving part. This lens actuator also includes means for correcting or compensating a spherical aberration, which is caused due to unevenness of the thickness of a transparent protection layer of the optical disc and/or movement between recording layers of a multi-layered recording disc.

In recent years, advancements have been made on high-density of the optical disc, and as a method for dealing with this is achieved by, mainly, shortening is made on the wavelength of a laser, as the light emitting element, or widening is made an aperture of an objective lens. Such high-density optical disc, since the spherical aberration mentioned above results into deterioration of signals, which are recorded or reproduced, then there is a necessity of a means or device for compensating that spherical aberration. For the purpose of compensating a large spherical aberration, a lens drive width of the lens actuator is set to be large, and further as the objective lens is applied a lens having a short focus distance.

In recent years, a demand is increased, in particular, for an optical disc apparatus, being smaller and thinner in sizes thereof, and for this reason, it is necessary to arrange each of parts thereof, in the optical disc apparatus, effectively, within a limited space thereof. With the following Patent Document 1, a lens actuator and an objective lens actuator are disposed to align vertically, in a focusing direction, i.e., in a normal direction of the optical disc surface.

[Patent Document 1] Japanese Patent Laying-Open No. 2003-338069 (2003), see FIG. 1 thereof.

BRIEF SUMMARY OF THE INVENTION

In the conventional art mentioned above, when trying to widen or enlarge the lens drive width of the lens actuator, i.e., to increase width for compensating the aberration, if determining to dispose the lens drive width on the side of the objective lens actuator, there is no necessity of widening an area of the apparatus, in any direction within the optical disc surface. However, in case of being applied into the thin-type optical disc apparatus, it is beyond such requirement; there is necessity of disposing the lens actuator, while keeping movable width of the moving part thereof, and the driving portion, while keeping a space thereof, and therefore the optical pickup comes to be thick in the thickness thereof. In particular, in recent years, advancements are made on technologies of the high-density recording and high-speed recording of the optical disc, and accompanying with this, there is necessity of reading out data with much higher accuracy and much higher speed; therefore, the moving part of the lens actuator must be driven at high-speed and within a wide region, comparing to that of the conventional art. In particular, when applying the thin-sized optical disc, the demand upon which is increasing, there is necessity of disposing those mechanisms within a limited space, with efficiency much higher than that of the conventional art.

An object of the present invention is to provided an optical pickup, being small in sizes thereof and able to deal with the high-density recording and high-speed recording of the disc, as well as, an optical disc apparatus applying the same therein.

The object mentioned above, according to the present invention, is accomplished by an optical pickup, mounting a lens actuator thereon, said lens actuator comprising: a lens having an optical axis in direction in parallel with an optical disc; a holder, which holds said lens thereon; a first guide shaft holding said holder, so as to regulate said holder to change a position thereof, into an inner surface direction of a surface having the optical axis of said lens as a normal line vector thereof; a second guide shaft, which regulates said holder to change the position thereof, into a normal line vector of an optical disc; and a reed screw, which moves said holder into direction of the optical axis of said lens, wherein a distance between the optical axis of said lens and the optical disc, a distance between a central axis of said first guide shaft and the optical disc, and a distance between a central axis of said second guide shaft and the optical disc are lager than a distance between a central axis of said reed screw and the optical disc.

Also, the object mentioned above, according to the present invention, is accomplished by the optical pickup, as described in the above, wherein upon a plane projected into a normal line direction of the optical disc, the central axis of said first guide shaft and the central axis of said second guide shaft are disposed between a central axis of the optical axis of the lens and the central axis of said reed screw.

Also, the object mentioned above, according to the present invention, is accomplished by the optical pickup, as described in the above, wherein upon a plane projected into a normal line direction of the optical disc, the central axis of said first guide shaft is disposed on a side of said reed screw, with respect to the central axis of said second guide shaft, and the central axis of said second guide shaft is disposed on a side of the central axis of the optical axis of said lens, with respect to said first guide shaft.

Also, the object mentioned above, according to the present invention, is accomplished by the optical pickup, as described in the above, further comprising an objective lens, and an objective lens actuator for driving said objective lens into a focusing direction and a tracking direction, wherein a part of said objective lens actuator and a part of the lens or a movable region of said holder overlap each other, upon a plane projecting into the focusing direction.

Also, the object mentioned above, according to the present invention, is accomplished by the optical pickup, as described in the above, wherein a minimum value of distance between an outer diameter of the lens and the optical disc, and a minimum value of distance between an outer diameter of a motor and the optical disc are smaller than a maximum value of distance between an outer configuration of said objective lens actuator and the optical disc.

Also, the object mentioned above, according to the present invention, is accomplished by an optical pickup, mounting a lens actuator thereon, said lens actuator comprising: a lens having an optical axis in direction in parallel with an optical disc; a holder, which holds said lens thereon; a first guide shaft holding said holder, so as to regulate said holder to change a position thereof, into an inner surface direction of a surface having the optical axis of said lens as a normal line vector thereof; a second guide shaft, which regulates said holder to change the position thereof, into a normal line vector of an optical disc; and a reed screw, which moves said holder into direction of the optical axis of said lens, wherein a part of said objective lens actuator and a part of the lens or a movable region of said holder overlap each other, upon a plane projecting into a focusing direction, and also a part of said reed screw and a part of said objective lens actuator overlap each other, upon a plane projecting into a tracking direction.

Also, the object mentioned above, according to the present invention, is accomplished by the optical pickup, as described in the above, wherein upon a plane projecting into the focusing direction, the optical axis of said lens is not in parallel with an axis, which is perpendicular to both of the tracking direction and the focusing direction.

According to the present invention, the lens actuator and the objective lens actuator can be disposed with the minimum area, and therefore small and thin sizing of the lens actuator can be achieved. With applying this lens actuator, it is possible to provide a cheap optical pickup, enabling the high-density and high-speed recording/reproducing of the optical disc.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

<Embodiment 1>

Explanation will be made on an embodiment 1, by referring to FIGS. 1 to 6. In those figures, "y"-axis indicates a radial direction of an optical disc 113, i.e., the tracking direction, "z"-axis direction indicates direction of an optical axis, i.e., the forcing direction, and "x"-direction indicates the direction, being perpendicular to both axis, the "y"-axis and the "z"-axis.

Figure 1:
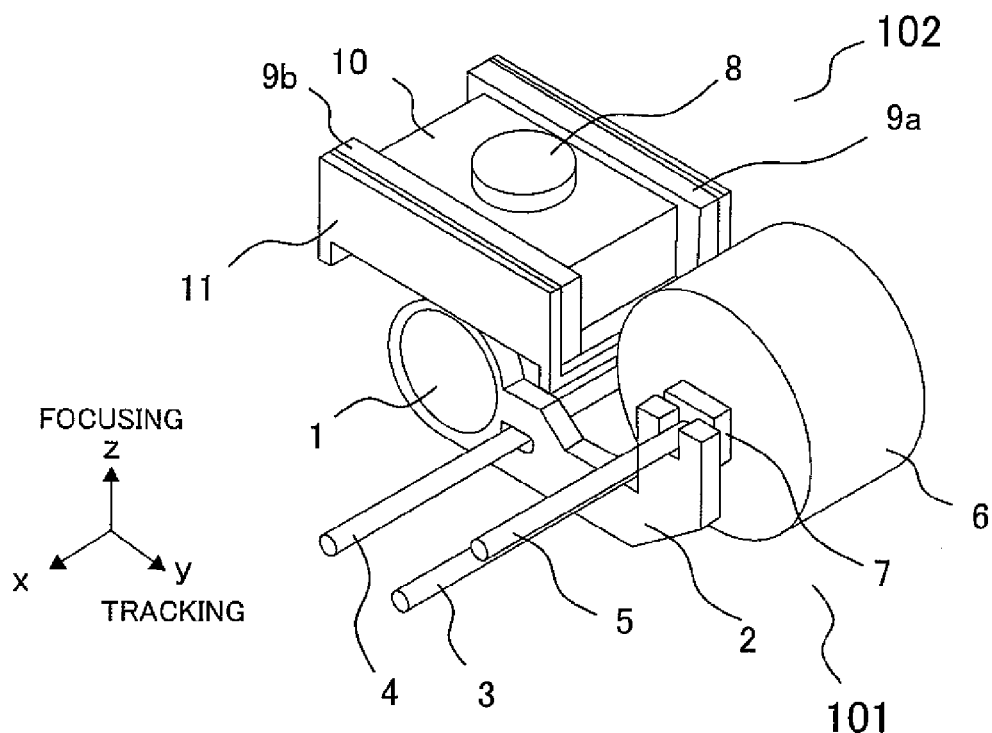
FIG. 1 is a perspective view for showing a lens actuator and an objective lens actuator, according to a first embodiment of the present invention.

FIG. 1 is a perspective view for showing the structures of a lens actuator 101 and an objective lens actuator 102, according to the present invention.

Figure 2:
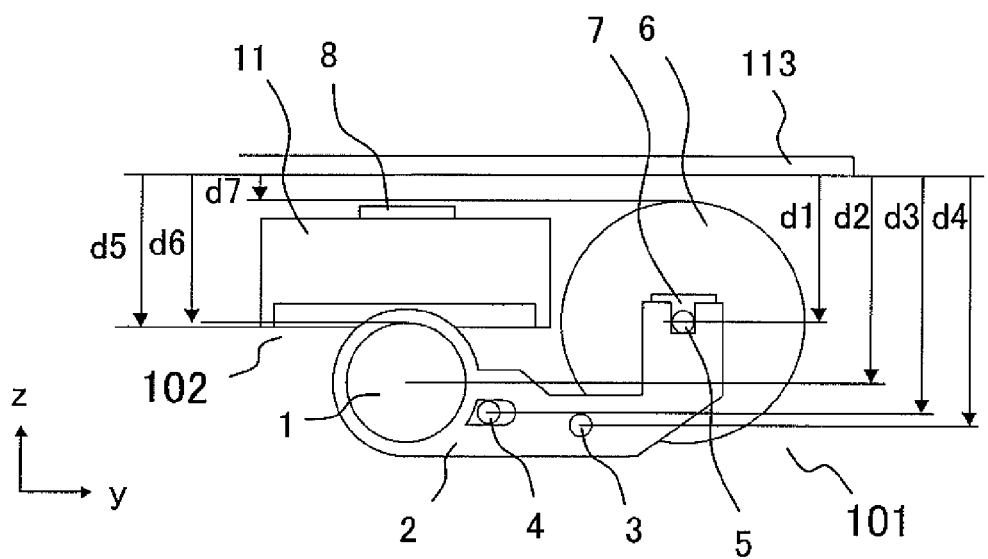
FIG. 2 is a plane view of the lens actuator and the objective lens actuator, according to the first embodiment of the present invention, seeing those in the direction of an optical axis of a lens.

FIG. 2 is an explanatory view for showing the arrangement of the lens actuator 101 and the objective lens actuator 102 shown in FIG. 1, seeing them in the direction of an optical axis of a lens 1.

Figure 3:
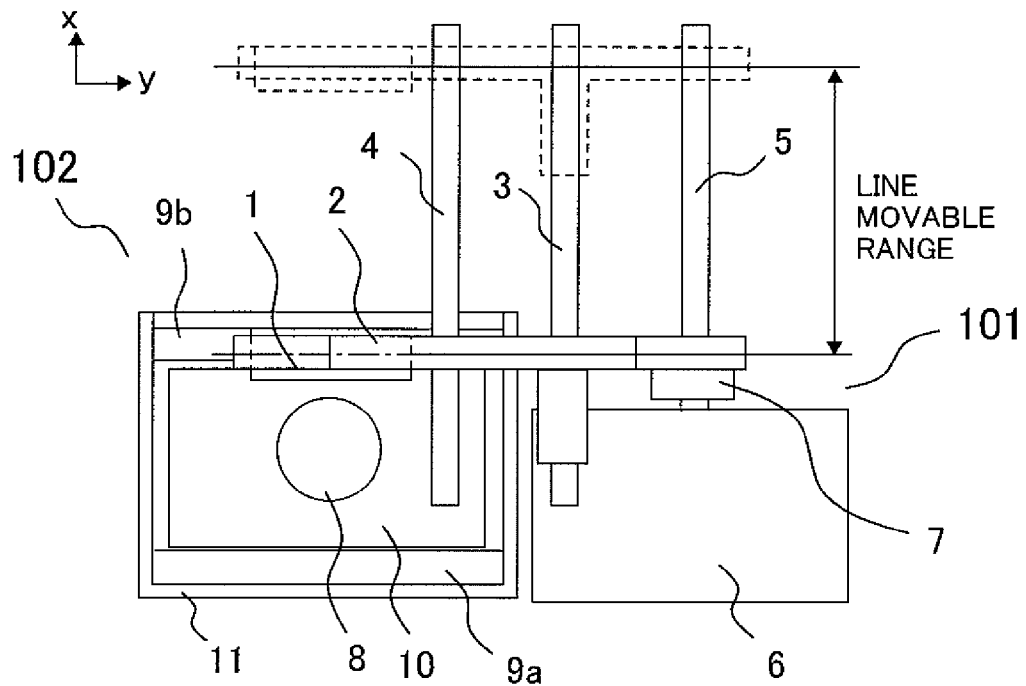
FIG. 3 is a plane view of the lens actuator and the objective lens actuator, according to the first embodiment of the present invention, seeing those in a focusing direction.

FIG. 3 is a view of seeing those shown in FIG. 1 in a positive direction of the focusing direction.

Figure 4:
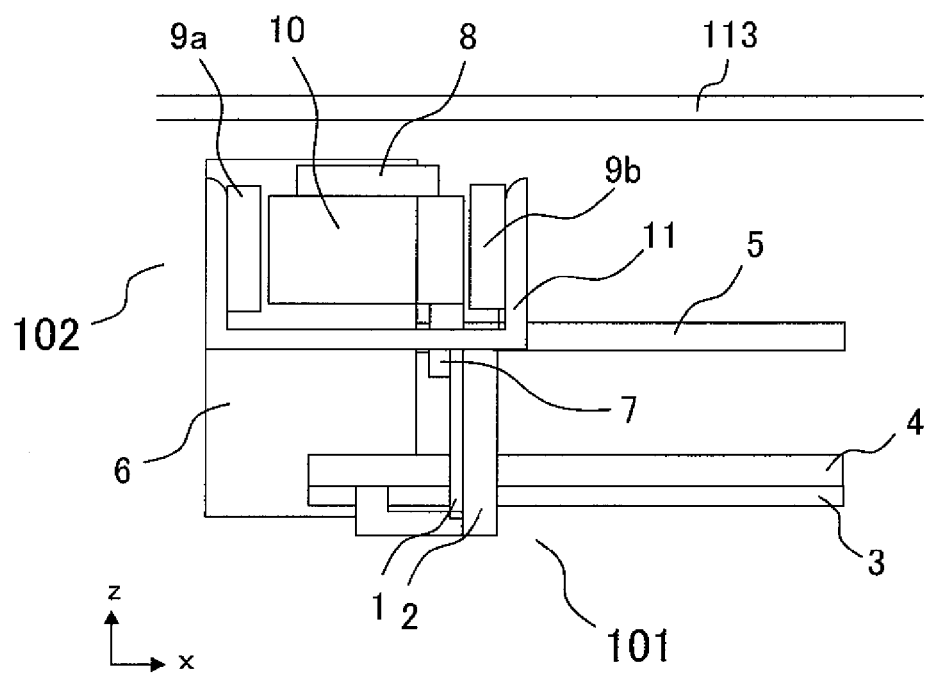
FIG. 4 is a plane view of the lens actuator and the objective lens actuator, according to the first embodiment of the present invention, seeing those in a tracking direction.

FIG. 4 is a view for explaining the arrangement of the lens actuator 101 and the objective lens actuator 102, seeing those in the positive direction of the tracking direction.

Figure 5:
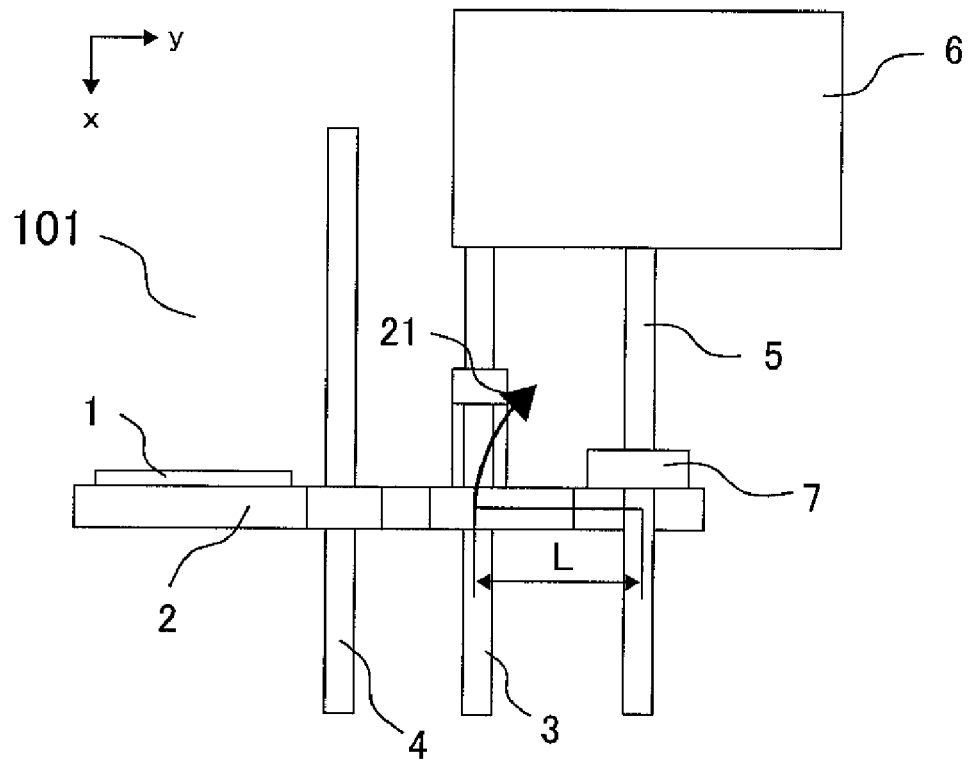
FIG. 5 is a plane view of the lens actuator, according to the first embodiment of the present invention, seeing it in the focusing direction.

FIG. 5 is a view of seeing the lens actuator 101 in the focusing direction.

Figure 6:
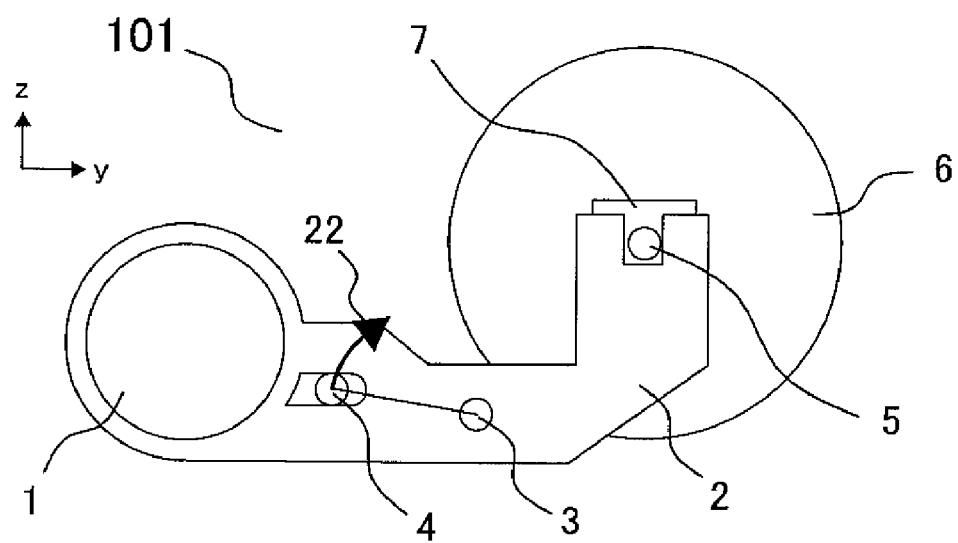
FIG. 6 is a plane view of the lens actuator, according to the first embodiment of the present invention, seeing it in the direction of optical axis of lenses.

FIG. 6 is a view of seeing the lens actuator 101 in the direction of the optical axis of the lens 1.

In each of those views, the lens 1 is attached on a holder 2. The holder 2 has the construction of being able to move in the direction of the optical axis of the lens 1 (i.e., the focusing direction of the lens) along a first guide shaft 3 and a second guide shaft 4, and is suppressed with using a nut 7 made from an elastic body. The nut 7 is structured not to rotate, with a rotating force generated by a motor 6, through a reed screw 5, by means of a rotation-lock (or anti-revolution) mechanism. Thus, to the motor 6 is fixed the reed screw 5, on which male threads are formed; i.e., thereby building up a mechanism wherein, with rotation of the motor 6, the nut 7 is driven in the optical axis direction of the lens 1, with torsion generated by female threads formed on the nut 7 and the male threads formed on the reed screw 5, and then the holder 2 suppressed by the nut 7 is driven in the same direction to the nut 7, i.e., the optical axis direction of the lens 1.

The objective lens 8 has an optical axis in the focusing direction, and is disposed at such a position that it comes across the optical axis of the lens 1, about to be vertical thereto, and it builds up the objective lens actuator 102, together with an objective lens holding member 10, magnets 9a and 9b, and a yoke 11. In that instance, the driving mechanism of the holder 2 may be made up with a linear driving mechanism with using a magnetic circuit therein, etc., other than the mechanism built up with the motor 6, and the driving force transmission mechanism from the reed screw 5 to the holder 2 may be made up with a rack gear, etc., other than the nut.

The laser beam, being emitted from a laser beam emitting means into the optical axis direction of the lens 1 and incident upon a side of the lens 1 opposite to the objective lens 8, after being bent into a direction toward the objective lens 8 by a laser reflection means at a point where the optical axis of the lens comes across the optical axis of the objective lens 8, passes through the objective lens 8 and focused upon a signal recording layer of the optical disc 113, and thereby forming a beam spot. In that instance, the spherical aberration can be compensated by driving the holder 2 up to an appropriate position through rotation of the motor 6, within the structures mentioned above.

FIG. 2 is a plane view of seeing the lens actuator 101 and the objective lens actuator 102, in the optical axis direction of the lens, wherein "d1" indicates the distance from the optical disc 113 up to a central axis of the reed screw 5, "d2" the distance from the optical disc 113 up to an optical axis of the lens 1, "d3" the distance from the optical disc 113 up to a central axis of the second guide shaft 4, "d4" the distance from the optical disc 113 up to a central axis of the first guide shaft 3, "d5" the distance from the optical disc 113 up to a point, being most far from the optical disc, among pints on the outer configure of the objective lens actuator 102, "d6" the distance from the optical disc 113 up to a point, being nearest to the optical disc, among points on an outer diameter of the lens 1, and "d7" the distance from the optical disc 113 up to a point, being nearest to the optical disc, among points on an outer diameter of the motor 6, respectively.

As is shown in FIG. 2, the optical axis of the lens 1, and the central axes of the first guide shaft 3 and the second guide shaft 4 are disposed at positions far from the optical disc 113 than the central axis of the reed screw 5, seeing them in the focusing direction. Thus, the distances "d2" to "d4" are determined to be larger than the distance "d1". With this, it is possible to provide the holder 2 having a space, in which the objective lens actuator 102 can be positioned on the side of the optical disc 113 than the lens 1, and thereby achieving small-sizing of the optical pickup.

Also in FIG. 2, the lens actuator 101 is so arranged that a point, which is nearest to the optical disc 113 on the outer diameter of the lens 1, comes to be smaller in the distance between the optical disc 113 than that between the point, which is most far from optical disc 113 among the points on the outer configuration of the objective lens actuator 102. Thus, the distance "d6" is determined to be smaller than the distance "d5".

Also, a point nearest to the optical disc 113 on the outer diameter is so arranged that, with utilizing a cutout portion of the yoke 11, the distance between the objective lens actuator 102 and the lens actuator 101 in the focusing direction comes to be small within a range, in which a movable area of the holder 2 does not contact with the yoke 11. Thus, the distance "d7" is determined to be smaller than the distance "d5". With this, the distance cam be made small between the holder 2 and the objective lens actuator 102, even if the diameter of the motor 6 is large, and thereby enabling to provide a thin-type optical pickup.

FIG. 3 is a plane view of the lens actuator 101 and the objective lens actuator 102, seeing them in the focusing direction, and FIG. 4 is a plane view of the lens actuator 101 and the objective lens actuator 102, seeing them in the tracking direction, respectively. As is shown in FIG. 3, they are so arranged that, when the holder 2 is driven up to a position near to the motor 6, a part of the lens 1 or the holder 2 and a part of the objective lens actuator 102 are in parallel with each other in the focusing direction. With this arrangement, it is possible to keep the movable region of the lens 1 large, but without bringing the lens actuator 101 to be large in the size thereof. Thus, there is obtained the structures for enabling to compensate the aberration on much large region, and the lens actuator for dealing with the high-density of the optical disc. Also, because of enabling to compensate the aberration on much large region, it is possible to moderate the specification of aberration characteristics of the objective lens 8; i.e., selection can be made on a cheap material, and thereby providing the lens actuator with a low cost.

Also, as is shown in FIG. 4, a part of the motor 6 and a part of the objective lens actuator 102 are so arranged that they are positioned to pile up on a plane, upon which they are projected. With this, even in case where the space therein is limited, such as, the optical pickup applied within the thin-type optical disc drive, for example, it is possible to apply a large motor 2 while keeping the space for locating the objective lens actuator 102 on the side of the optical disc 113 than the lens 1, and therefore, since a large torque can be maintained, it is possible to provide a small-size optical pickup, enabling to drive the holder 2 at high speed. For this reason, there can be obtained the optical pickup for enabling to conduct the compensation of aberration at high speed, as well as, for dealing with the high-speed recording/reproducing.

Further, also in case when the reed screw 3 and the nut 7 bite each other due to torsion, because of large torque generated by the motor 6, they build up a mechanism for escaping from that condition, easily.

FIG. 5 is a plane view of projecting the lens actuator 101 into the focusing direction. Because of a gap between a bearing of the holder 2 and the reed screw 5, the first guide shaft 3 is provided for the purpose of maintaining rectilinear progress of the holder 2. As is shown in FIG. 5, in case when a first moment 21 received by the holder 2 receives is large, due to friction between the holder 2 and the first guide shaft 3, etc., when it is driven, there is a problem that driving of the holder 2 is hampered; therefore, by arranging the first guide 3 at a position, as near to the central axis of the reed screw, as possible, it is possible to reduce a distance "L" from a center of the moment 21. Namely, they are in such the structures that the first moment 21 comes to be small, and then the holder 2 can be driven, smoothly, along the first guide shaft 3.

FIG. 6 is a plane view of projecting the lens actuator 101 into the optical axis direction of the lens 1. As is shown in FIG. 5, the second guide shaft 4 prevents the lens 1 from being moved due to rotation of the holder 2, i.e., a cause of a second moment 22 generating around the first guide shaft 3, because of vibration from an outside, etc. Accordingly, an accuracy of preventing the lens 1 from being moved by the second guide shaft 4 can be improved much more, as the position locating the second guide shaft 4 comes closer to the lens 1. With this, it is possible to provide the lens actuator, enabling to conduct preferable compensation upon the aberration, while lessening instability of control due to lowering of the rectilinear progress and/or vibration thereof, when the holder 2 is driven.

<Embodiment 2>

Figure 7:
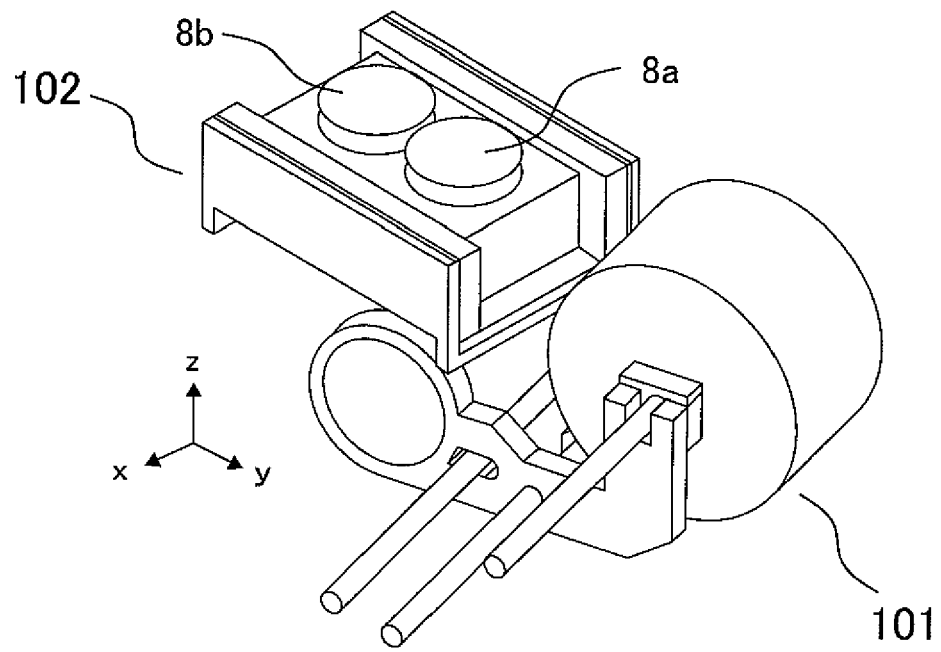
FIG. 7 is a perspective view for showing the lens actuator and the objective lens actuator, according to a second embodiment of the present invention.
Figure 8:
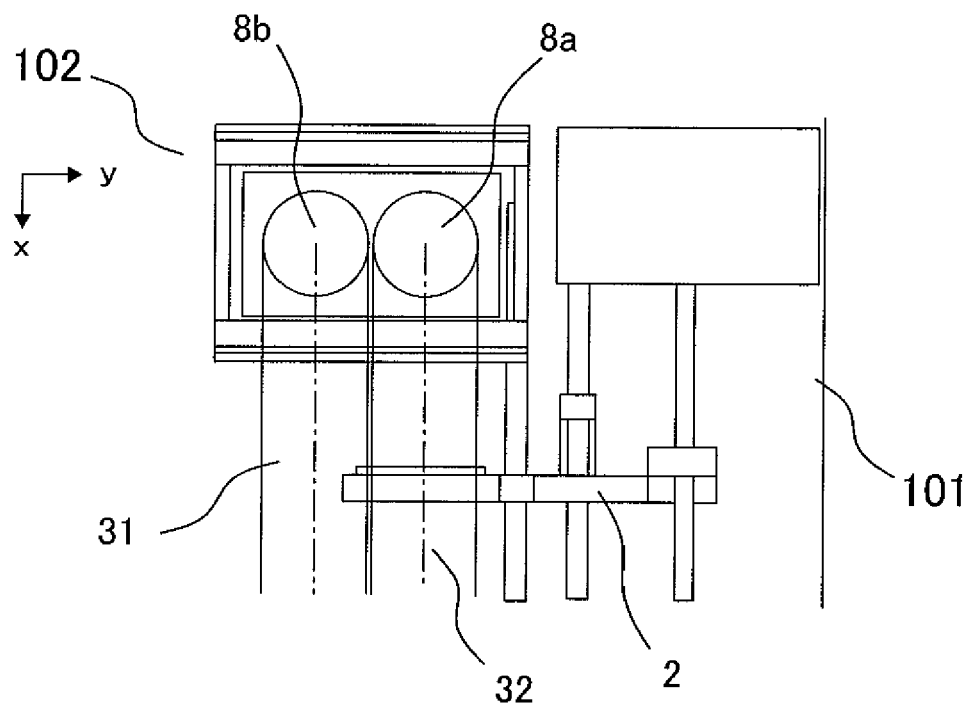
FIG. 8 is a plane view of showing arrangement of an actuator and the objective lens actuator, for explaining an object to be solved, according to the second embodiment of the present invention.
Figure 9:
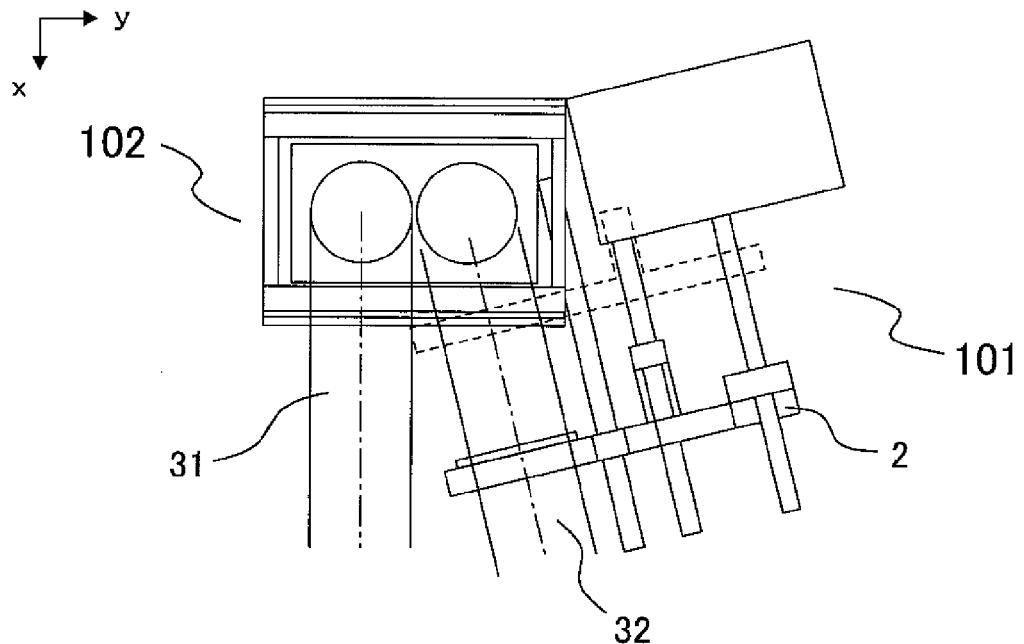
FIG. 9 a plane view for showing arrangement of the lens actuator and the objective lens actuator, according to the second embodiment of the present invention.

Next, other embodiment according to the present invention will be shown in FIGS. 7 to 9. In those figures, the "y"-axis indicates the radial direction of the optical disc 113, i.e., the tracking direction, the "z"-axis the optical axis direction of the objective lens 8, i.e., the focusing direction, and the "x"-direction the direction perpendicular to both axes, i.e., the "x"-axis and "y"-axis, respectively.

FIG. 7 is a perspective view for showing the arrangement of the lens actuator 101 and the objective lens actuator 102 within the present embodiment.

FIGS. 8 and 9 are plane views for showing the lens actuator 101 and the objective lens actuator 102, within the present embodiment, but projecting them into the focusing direction in the arrangement thereof.

As is shown in FIG. 7, there is case where the first objective lens 8a, the aberration compensation of which is necessary for the objective lens actuator 102, and the second objective lens, no aberration compensation of which is necessary, are mounted aligning in the tracking direction. For the purpose of reducing a drive range of the optical pickup 111 to be small, in the tracking direction with respect to the optical disc 113, it is preferable that the distance between the first objective lens 8a and the second objective lens 8b is small in the tracking direction.

In that instance, if an optical path of a first laser beam 31 directing to the objective lens 8a and an optical path of a second laser beam 32 directing to the objective lens 8b are in parallel, as is shown in FIG. 8, then a part of the holder 2 obstacles the second laser beam 32. Then, with such an arrangement of the lens actuator 101, as is shown in FIG. 9, that the optical path of the first laser beam 31 has an angle with respect to the optical path of the second laser beam 32, i.e., the optical axis of the lens 1 will not be in parallel with the axis perpendicular to both direction, the tracking direction and the focusing direction, it is possible to bring the second laser beam 32 and the holder 2 not to pile up with each other, even if the holder 2 is moved to the position near to the objective lens actuator 102, in the structures thereof. With doing this, it is possible to provide the optical pickup having a small drive range of the optical pickup 111, in the tracking direction with respect to the optical disc 113, i.e., being suitable for small-sizing thereof.

<Embodiment 3>

Next, explanation will be made on an embodiment of mounting the lens actuator 101, according to the present invention, on the optical pickup 111, by referring to FIG. 10. In this figure, the "y"-axis indicates the radial direction of the optical disc 113, i.e., the tracking direction, the "z"-axis the optical axis direction of the objective lens 8, i.e., the focusing direction, and the "x"-direction the direction perpendicular to both axes, i.e., the "x"-axis and "y"-axis, respectively. Although herein is shown an example of applying the lens actuator 101 shown in the embodiment 1 mentioned above, however it is also possible to build up the optical pickup 113, in the similar manner, even in the case of applying the lens actuator shown in the other embodiment.

Figure 10:
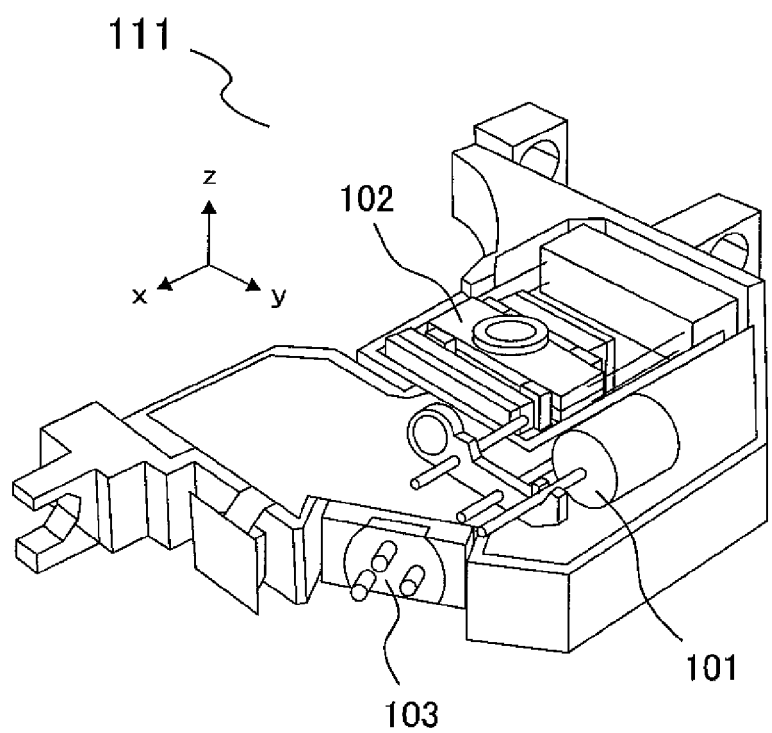
FIG. 10 is a perspective view of an optical pickup, applying therein the lens actuator according to the present invention.

FIG. 10 is perspective view for showing the optical pickup, according to the present embodiment, briefly.

As is shown in FIG. 10, the lens actuator 101 is mounted or loaded within the optical pickup 111. After passing through the lens 1, the lights emitting from a light emitting element 103 are focused upon the recording surface of the optical disc 113 by means of a rear objective lens 8. With applying the lens actuator according to the present invention, in this manner, there can be obtained the optical pickup 111, being suitable for high-density and high-speed recording/reproducing of data, which can be made small and thin in the sizes thereof.

<Embodiment 4>

Next, explanation will be made on an embodiment of the optical disc apparatus applying the optical pickup 111, which mounts the lens actuator according to the present invention therein, by referring to FIG. 11. Although herein is shown an example of applying the optical pickup 111 according to the first embodiment mentioned above therein, however it is also possible to build up the optical disc apparatus 112, in the similar manner, even in the case of applying the optical pickup 111 shown in the other embodiment.

Figure 11:
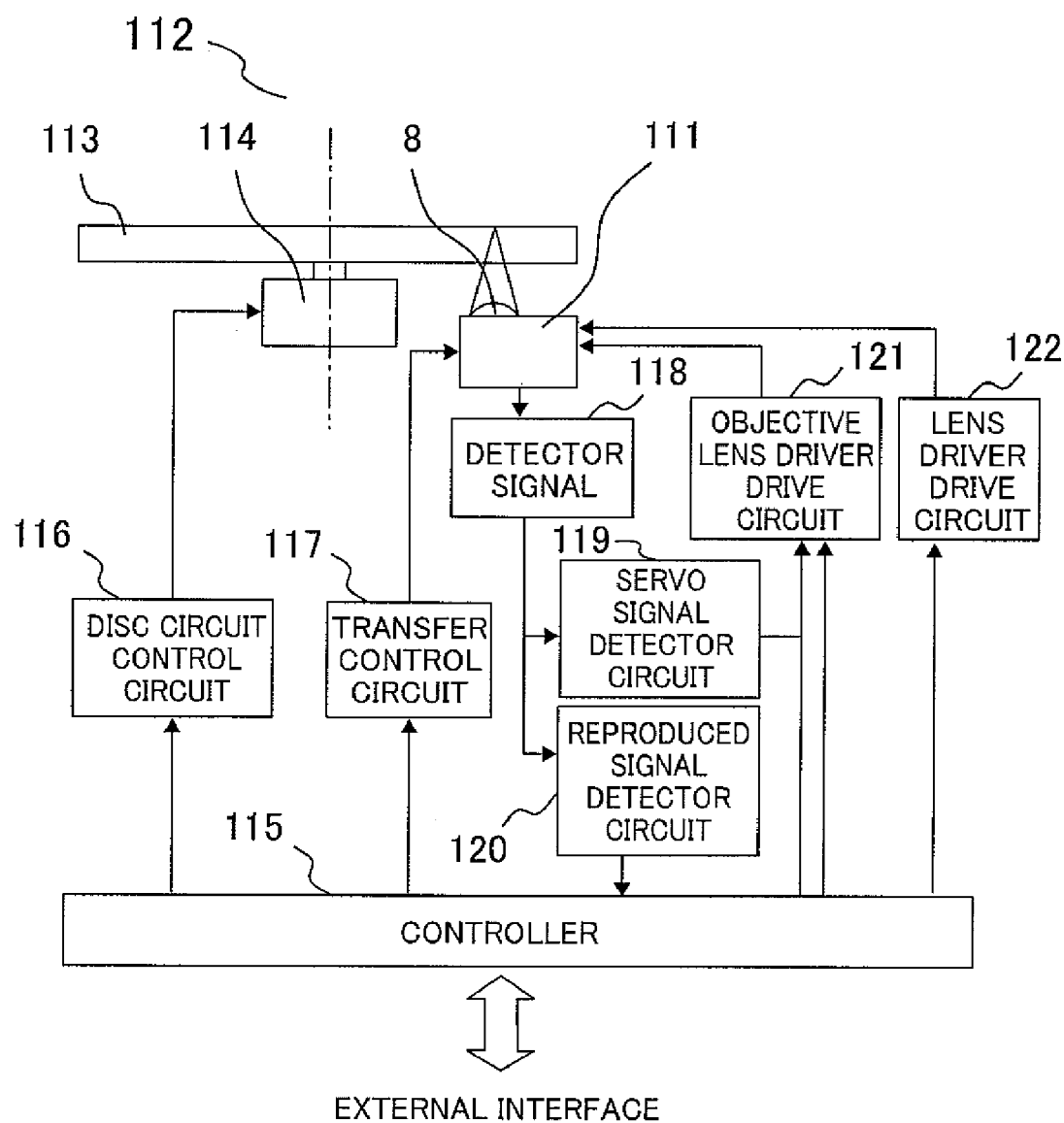
FIG. 11 is a view for showing a flow of signal processing within an optical disc apparatus, applying therein the lens actuator according to the present invention.

FIG. 11 is a view for showing the structures of the optical disc apparatus, according to the present invention.

The optical disc apparatus 112 comprises a spindle motor 114 for rotating the optical disc 113, the optical pickup 111, a transfer mechanism for moving the optical pickup 111 into the radial direction of the optical disc 113, and a controller for controlling those. With the controller 115 is connected a rotation control circuit 116 for the spindle motor 114, so that rotation control is conducted on the optical disc 113, which is attached or loaded on the spindle motor 114.

Also, with the controller 115 is also connected a transfer control circuit 117 for the optical pickup 111, so that transfer control is conducted for moving the optical pickup 111 into the radial direction of the optical disc 113. Various kinds of signals 118, which are detected by the optical pickup 111, are sent to a servo signal detector circuit 119 and a reproduced signal detector circuit 120, wherein a focus error signal and a tracking error signal are produced within the servo signal detector circuit 119, and they are combined with an instruction(s) from a controller 115, thereby to conduct the position control of the objective lens 8 upon basis of a signal from an actuator drive circuit. Also, the reproduced signal calculated by the reproduced signal detector circuit 120 is sent to the controller 115, and therefore, the moving part of the lens actuator 101 is moved to such a position that the reproduced signal can be optimized, by means of a lens actuator drive circuit 122. Thereafter, by means of the reproduced signal detector circuit, the information recorded on the optical disc is reproduced.

In this manner, with mounting the optical pickup 111, according to the present invention, it is possible to achieve the high-performance optical disc apparatus 112, being suitable for the high-speed recording/reproducing and the high-density recording/reproducing of data.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical pickup, mounting a lens actuator thereon, said lens actuator comprising:
   a lens having an optical axis in direction in parallel to a data layer of an optical disc;
   a holder, which holds said lens thereon;
   a first guide shaft holding said holder, so as to regulate said holder to change a position thereof, into an inner surface direction of a surface having the optical axis of said lens as a normal line vector thereof;
   a second guide shaft, which regulates said holder to change the position thereof, into a normal line vector of an optical disc; and
   a reed screw, which moves said holder into direction of the optical axis of said lens, wherein
   a distance between the optical axis of said lens and the optical disc, a distance between a central axis of said first guide shaft and the optical disc, and a distance between a central axis of said second guide shaft and the optical disc are larger than a distance between a central axis of said reed screw and the optical disc, and upon a plane projected into a normal line direction of the optical disc, the central axis of said first guide shaft and the central axis of said second guide shaft are disposed between a central axis of the optical axis of the lens and the central axis of said reed screw.

2. The optical pickup, as described in the claim 1, wherein upon a plane projected into a normal line direction of the optical disc, the central axis of said first guide shaft is disposed on a side of said reed screw, with respect to the central axis of said second guide shaft, and the central axis of said second guide shaft is disposed on a side of the central axis of the optical axis of said lens, with respect to said first guide shaft.

3. The optical pickup, as described in the claim 2, further comprising an objective lens, and an objective lens actuator for driving said objective lens into a focusing direction and a tracking direction, wherein
   a part of said objective lens actuator and a part of the lens or a movable region of said holder overlap each other, upon a plane projecting into the focusing direction.

4. The optical pickup, as described in the claim 3, wherein a minimum value of distance between an outer diameter of the lens and the optical disc, and a minimum value of distance between an outer diameter of a motor and the optical disc are smaller than a maximum value of distance between an outer configuration of said objective lens actuator and the optical disc.

5. The optical pickup, as described in the claim 4, wherein, upon a plane projecting into the focusing direction, the optical axis of said lens is not in parallel with an axis, which is perpendicular to both of the tracking direction and the focusing direction.

6. The optical pickup, as described in the claim 1, further comprising an objective lens, and an objective lens actuator for driving said objective lens into a focusing direction and a tracking direction, wherein
   a part of said objective lens actuator and a part of the lens or a movable region of said holder overlap each other, upon a plane projecting into the focusing direction.

7. The optical pickup, as described in the claim 6, wherein a minimum value of distance between an outer diameter of the lens and the optical disc, and a minimum value of distance between an outer diameter of a motor and the optical disc are smaller than a maximum value of distance between an outer configuration of said objective lens actuator and the optical disc.

8. The optical pickup, as described in the claim 7, wherein, upon a plane projecting into the focusing direction, the optical axis of said lens is not in parallel with an axis, which is perpendicular to both of the tracking direction and the focusing direction.

9. An optical disc apparatus, mounting the optical pickup described in the claim 1, thereon.

10. An optical pickup, mounting a lens actuator thereon, said lens actuator comprising:
   a lens having an optical axis in direction in parallel to a data layer of an optical disc;
   a holder, which holds said lens thereon;
   a first guide shaft holding said holder, so as to regulate said holder to change a position thereof, into an inner surface direction of a surface having the optical axis of said lens as a normal line vector thereof;
   a second guide shaft, which regulates said holder to change the position thereof, into a normal line vector of an optical disc;
   a reed screw, which moves said holder into direction of the optical axis of said lens; and
   an actuator for driving said objective lens into a focusing direction and a tracking direction, wherein
   a distance between the optical axis of said lens and the optical disc, a distance between a central axis of said first guide shaft and the optical disc, and a distance between a central axis of said second guide shaft and the optical disc are larger than a distance between a central axis of said reed screw and the optical disc,
   a minimum value of distance between an outer diameter of the lens and the optical disc, and a minimum value of distance between an outer diameter of a motor and the optical disc are smaller than a maximum value of distance between an outer configuration of said objective lens actuator and the optical disc, and
   upon a plane projecting into the focusing direction, the optical axis of said lens is not in parallel with an axis, which is perpendicular to both of the tracking direction and the focusing direction.

11. An optical pickup, mounting a lens actuator thereon, said lens actuator comprising:
   a lens having an optical axis in direction in parallel to a data layer of an optical disc;
   a holder, which holds said lens thereon;
   a first guide shaft holding said holder, so as to regulate said holder to change a position thereof, into an inner surface direction of a surface having the optical axis of said lens as a normal line vector thereof;
   a second guide shaft, which regulates said holder to change the position thereof, into a normal line vector of an optical disc; and
   a reed screw, which moves said holder into direction of the optical axis of said lens, wherein
   a part of said objective lens actuator and a part of the lens or a movable region of said holder overlap each other, upon a plane projecting into a focusing direction, and also a part of said reed screw and a part of said objective lens actuator overlap each other, upon a plane projecting into a tracking direction, and
   upon a plane projecting into the focusing direction, the optical axis of said lens is not in parallel with an axis, which is perpendicular to both of the tracking direction and the focusing direction.

12. An optical disc apparatus, mounting the optical pickup described in the claim 11, thereon.

* * * * *